United States Patent
Kuroyanagi

(10) Patent No.: US 8,346,806 B2
(45) Date of Patent: Jan. 1, 2013

(54) IMAGE PROCESSING APPARATUS AND CONTROL METHOD

(75) Inventor: Satoshi Kuroyanagi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/078,875

(22) Filed: Apr. 1, 2011

(65) Prior Publication Data

US 2011/0179348 A1    Jul. 21, 2011

Related U.S. Application Data

(63) Continuation of application No. 11/313,604, filed on Dec. 20, 2005, now Pat. No. 8,176,075.

(30) Foreign Application Priority Data

Dec. 28, 2004  (JP) ................. 2004-380503
Dec. 1, 2005   (JP) ................. 2005-348098

(51) Int. Cl.
    *G06F 17/30* (2006.01)

(52) U.S. Cl. ........................................... 707/781

(58) Field of Classification Search .................. None
See application file for complete search history.

(56) References Cited

U.S. PATENT DOCUMENTS

| 6,237,010 | B1 | 5/2001 | Hui et al. |
| 6,373,507 | B1 | 4/2002 | Camara et al. |
| 2003/0167317 | A1* | 9/2003 | Deen et al. ............ 709/219 |
| 2004/0105104 | A1* | 6/2004 | Ishikawa et al. ............ 358/1.6 |

FOREIGN PATENT DOCUMENTS

| JP | 2000118085 A | * | 4/2000 |
| JP | 2003-030031 A |   | 1/2003 |
| WO | 2004/008310 A2 |   | 1/2004 |

* cited by examiner

*Primary Examiner* — Syed Hasan

(74) *Attorney, Agent, or Firm* — Canon USA Inc IP Division

(57) ABSTRACT

An image processing apparatus includes a browser which obtains an external resource or internal resource of the apparatus and displays the resource on the display unit, and a storage unit for storing an internal resource that can be displayed on the display unit. The image processing apparatus performs control not to display information by which storage location of the internal resource in the storing unit is identifiable in the case where the resource obtained by the browser unit is an internal resource.

13 Claims, 17 Drawing Sheets

FIG.10

XXX WEB PAGE

·NEWS
MULTIFUNCTION INKJET PRINTER IJ-MFP
SERIES TO BE ON THE MARKET IN AUGUST.
XXX ANNOUNCES TECHNICAL COLLABORATION
WITH YYY CORPORATION.
NEW DIGITAL CAMERA PRODUCT TO BE
ON THE MARKET IN JULY.

PRODUCTS   SUPPORT   DOWNLOADS   CONTACT US http://www.XXX.jp/index.htm          PAGE 1

IMAGE PROCESSING APPARATUS AND CONTROL METHOD

CROSS REFERENCE TO RELATED APPLICATIONS

This application is a Continuation of U.S. patent application Ser. No. 11/313,604, filed Dec. 20, 2005, entitled "IMAGE PROCESSING APPARATUS AND CONTROL METHOD", the content of which is expressly incorporated by reference herein in its entirety. This application also claims priority from Japanese Patent Application No. 2004-380503 filed Dec. 28, 2004 and No. 2005-348098 filed Dec. 1, 2005, which are hereby incorporated by reference herein in their entirety.

BACKGROUND OF THE INVENTION

1. Field of the Invention

The present invention relates to an image processing apparatus and a method of controlling the display thereof. In particular, the present invention has a preferred application in a multifunction image forming device that includes a web browser function.

2. Description of the Related Art

Web browsers are generally used to view the contents on the World Wide Web (WWW). In addition to the contents, the web browser displays information with which storage location of the resource can be identified, such as the uniform resource locator (URL) or the path name of the file of the content currently viewed, on a display area such as the address bar. Hereinafter, the storage location of a resource such as a content on the Web (or, merely referred to as contents) or a file stored in the FTP server will be referred to as URL, and the storage location of files in general will be referred to as the path name. However, both storage locations may be collectively referred to as URL in the case where it is not necessary to distinguish between the storage locations. Furthermore, regardless of whether such contents on the Web and files are located within the apparatus or outside the apparatus, contents and files will be collectively called a resource. The URL or the path to the file of the content is displayed as it is on the address bar on the web browser, regardless of whether the displayed content is obtained from a WWW server, over a local area network (LAN), or from a file system of the device equipped with the web browser.

In recent years, web browsers have been installed in image processing apparatus such as a multifunction device so as to be able to display contents on the operation section having a display function. (For example, refer to Japanese Patent Application Laid-Open No. 2003-122279).

In the case of an integrated device such as the image processing apparatus, file systems and directory configuration within the device are often kept secret from a user. However, if a file within the system of such integrated device is displayed on a browser and the path to the file is displayed as it is, the file system of the device such as the directory structure will become known to the user. As a result, it may lead to an ill-intentioned user gaining unauthorized access to the file system within the device.

SUMMARY OF THE INVENTION

In view of the above problems, the present invention is directed to controlling the displaying of an address by a web browser installed in an integrated device such as an image processing apparatus in which the file system is kept secret, and improving the security of the device.

An aspect of the present invention is directed to an image processing apparatus including a browser unit for obtaining an external resource or resource within the apparatus and displaying the resource on a display unit, a storage unit for storing an internal resource that can be displayed on the display unit, and a control unit for controlling the browser unit so as to not display information by which the storage location of the internal resource in the data storage unit is identifiable when the resource obtained by the browser unit is the internal resource stored in the data storage unit.

Another aspect of the present invention is to provide an image processing apparatus including a browser unit for obtaining a resource within the device and displaying it on a display unit, a storage unit for storing an internal resource that can be displayed on the display unit, wherein the internal resource includes a first resource stored in a first storage area wherein the storage location of resource within the storage unit is managed so as to be kept secret, and a second resource stored in a second storage area wherein the storage location of the resource in the storage unit can be disclosed, and a control unit for controlling the browser unit so as to not display on the display unit information by which the storage location of the first resource is identifiable when the browser unit displays a first resource stored in the first storage area.

Another aspect of the present invention is to provide an image processing apparatus including a browser unit for obtaining an external resource or resource within the apparatus and visualizing it on a visualizing unit, a storage unit for storing an internal resource that can be visualized by the visualizing unit, and a control unit for controlling the browser unit so as to not output to the visualizing unit information by which the storage location of the internal resource in the storage unit is identifiable when the resource obtained by the browser unit is an internal resource stored in the storage unit.

Other features and advantages of the present invention will become apparent to those skilled in the art upon reading of the following detailed description of embodiments thereof when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 shows an example of a printout of an external content.

DETAILED DESCRIPTION OF THE EMBODIMENTS

Embodiments of the invention will be described in detail below with reference to the drawings.

First Embodiment

Figure 1:
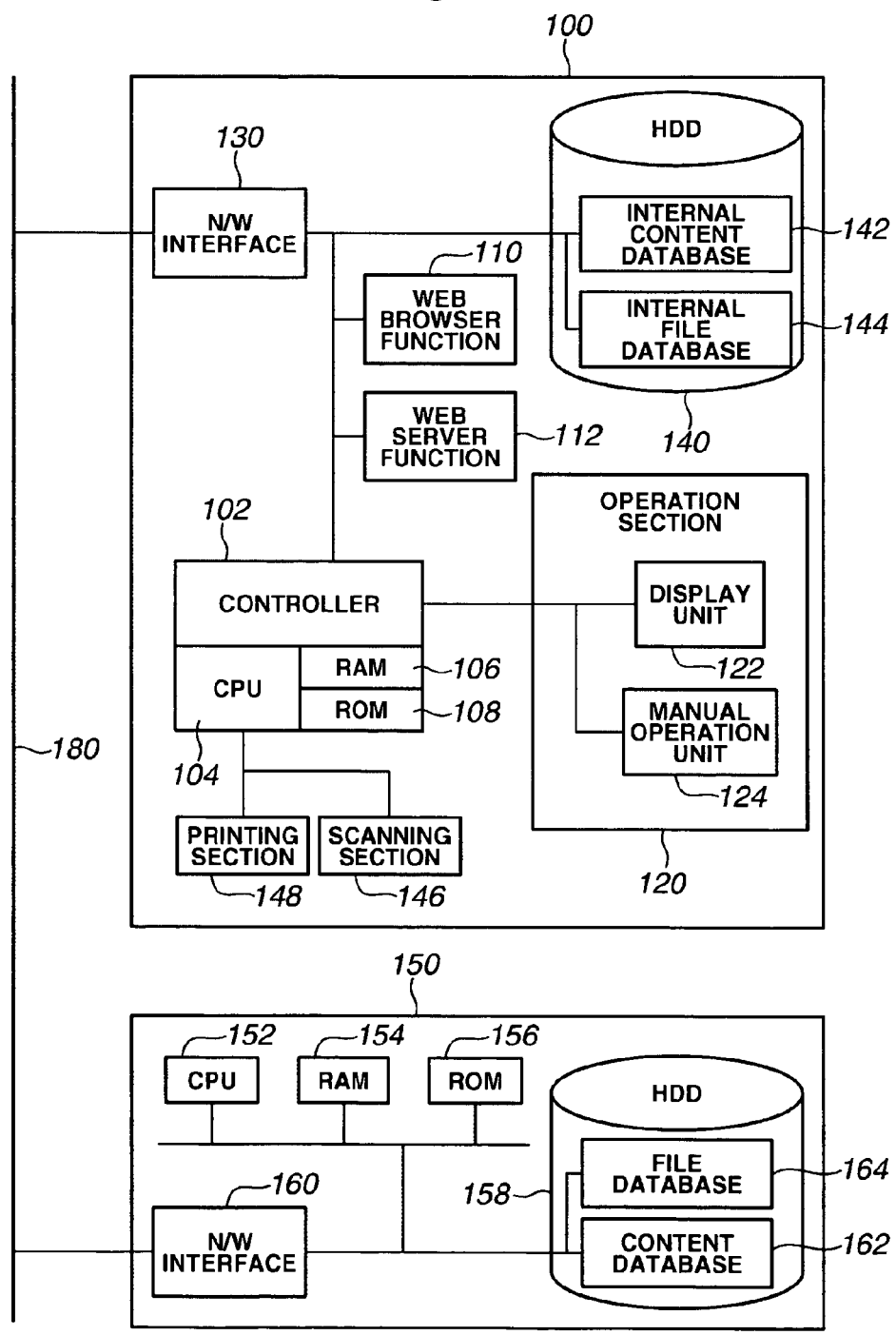
FIG. 1 is a block diagram of a system example which includes a multifunction device and a web server according to an embodiment of the present invention.

FIG. 1 is a block diagram illustrating an example of a system including an image processing apparatus and a web server according to an embodiment of the present invention. In FIG. 1, a multifunction device 100 is shown as an example of an image processing apparatus according to the present embodiment.

The multifunction device 100 is connected to a web server 150 through a network 180 so as to communicate with the web server 150. An external device that can be connected to the multifunction device 100 through the network 180 is not limited to the web server 150 as illustrated in FIG. 1. For example, the multifunction device 100 can be configured to be connectible to a plurality of external devices through the network 180. Additionally, a plurality of multifunction devices can be configured to be connected through network 180.

Furthermore, the multifunction device 100 includes a web browser function by which the contents provided by the web server 150 through the network 180 or contents within the multifunction device 100 can be displayed. In the descriptions to follow, contents within the multifunction device 100, or contents originally stored in the multifunction device 100, will be referred to as internal contents. Additionally, resources managed by the web server that are released from the web server will be referred to as contents.

The multifunction device 100 includes a controller 102, a central processing unit (CPU) 104, a random access memory (RAM) 106, a read only memory (ROM) 108, a web browser function 110, and a web server function 112. Additionally, the multifunction device 100 includes an operation section 120, a network interface (N/W interface) 130, a hard disk (HDD) 140, a scanning section 146, and a printing section 148. The hard disk 140 includes an internal content database 142 and an internal file database 144. The operation section 120 includes a display unit 122 and manual operation unit 124.

The controller 102 controls the functional parts of the multifunction device 100 and its overall operation. The controller 102 includes the CPU 104, the RAM 106, and the ROM 108. The CPU 104 performs the control by downloading a program stored in the ROM 108 or hard disk 140 onto the RAM 106 and executing the program.

The web browser function 110 is to interpret contents in the web server 150 or within the multifunction device 100 and display the content on the display unit 122. For example, the web browser function 110 displays contents stored in the internal database 142 or data files stored in the internal database 144 on the display unit 122.

Additionally, for example, through the network interface 130, the web browser function 110 downloads contents stored in the external content database 162 in the web server 150 that is connected through network 180 and displays the contents on the display unit 122.

The web server function 112 provides a WWW server function. Various contents stored in the internal content database within the hard disk 140 are provided as web contents in response to access requests from external web clients such as a personal computer (not shown) that has a web browser function.

In FIG. 1, the web browser function 110 and web server function 112 that are configured as independent hardware can also be implemented by software respectively. That is, applications that realize the web browser function can be installed in the hard disk 140 or the ROM 108 and the CPU 104 can run the web browser applications. In the same manner, an application or service for realizing a web server can be installed in the hard disk 140 or ROM 108 and the CPU can run the web server application or service.

Figure 3:
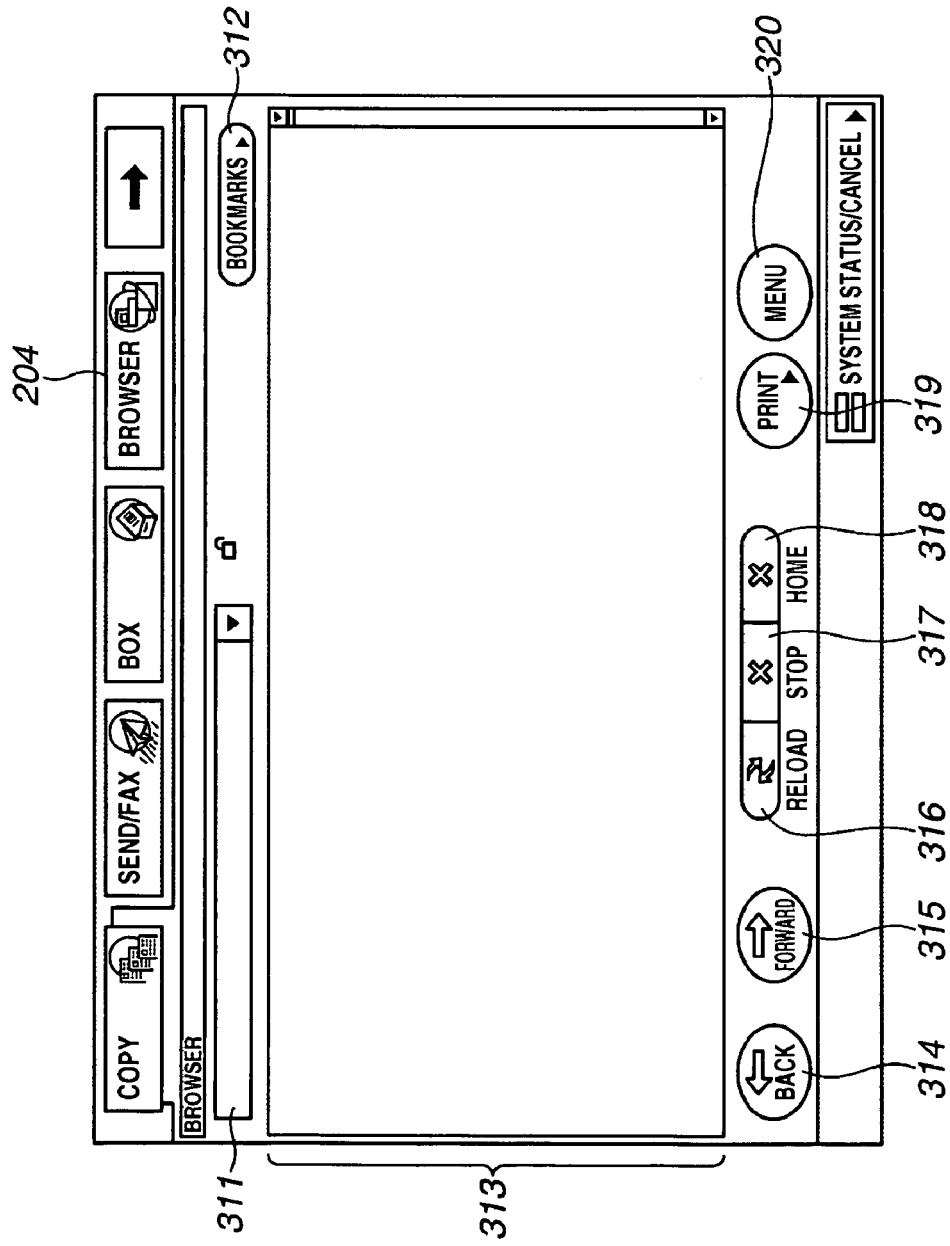
FIG. 3 shows an example of a display screen in which a browser function is activated.

As described above, the operation section 120 includes the display unit 122 and the manual operation unit 124 and enables the user to make various settings or operations on the multifunction device 100. The display unit 122 displays contents by the web browser function 110 and also displays the operating or setting screen of the multifunction device 100. An example of a display screen by the web browser function 110 on the display unit 122 is illustrated in FIG. 3 which is described later.

While the web browser function 110 is activated, the display unit 122 becomes a web browser display screen, and the manual operation unit 124 accepts also operations intended for the web browser function 110. The manual operation unit 124 can be configured as the display unit 122 employing a touch panel or touch screen, or configured independent of the display unit 122 employing buttons such as ten-key buttons. Additionally, the manual operation unit 124 can be configured to employ both touch panel and buttons. Furthermore, a mouse, track ball, joystick, or keyboard (not shown) can be connected to the multifunction device 100 to constitute a part of the manual operation unit 124.

The network interface 130 is an interface for connecting the multifunction device 100 and network 180, and data is transmitted or received to and from external devices such as the web server 150 through the network 180.

The hard disk 140 is a large-capacity storage medium and stores various programs to be executed by CPU 104 and various setting values of the multifunction device 100. The hard disk 140 includes an internal content database 142 and an internal file database 144.

The internal content database 142 stores web contents to be released to the outside by the web server function 112. Typical examples of internal contents are HyperText Markup Language (HTML) files and Common Gateway Interface (CGI) scripts. Additionally, contents such as document files created on PC applications, that are registered in the internal content database 142 for release on the web, are internal contents.

The internal file database 144 stores data files that are not web contents but are originally used within the device.

Among the internal files are image data temporarily generated in conducting image processing operations using the scanning section 146 or the printing section 148, various setting values for the multifunction device 100 as described above, or document data or image data that are not released to the outside by the web server function 112. Since internal files are not released by the web server function 112, an external personal computer (not shown) having a web browser function cannot access the files. However, if the web browser function 110 of the multifunction device 100 is used, the internal files can be accessed. Additionally, it is possible to access the internal contents by using the web browser function 110.

The interior of the hard disk 140 is managed by a hierarchical structure file system. The logical storage location of a desired file within the hard disk 140 can be found out if a volume name of the disk, the upper-to-lower directory folder hierarchy, and a file name are known.

The scanning section 146 reads the original image and generates image data, or, in other words, scans images. The printing section 148 outputs an image based on the original image or printing data received from the outside onto a printing medium, namely, prints images on a printout paper. Since the scanning section 146 and printing section 148 are configured in the same way as the scanning section (the reading section), and the printing section (the image output or image forming section) of conventional multifunction devices, detailed descriptions are omitted.

Web server 150 includes a CPU 152, RAM 154, ROM 156, a hard disk 158, and a network interface (N/W interface) 160. The hard disk 158 includes an external database 162 and an external file database 164.

The CPU 152 performs overall control of the web server 150 by downloading and running various programs stored in the ROM 156 or hard disk 158 onto the RAM 154. The web server 150 includes a web service function and a file transfer protocol (FTP) function, and these functions are realized by the CPU 152 running the program installed in the hard disk 158.

The Network interface 160 connects the web server 150 and network 180, and data is transmitted and received to and from the multifunction device 100 through the network 180.

Similar to the internal content database 142 of the multifunction device 100, the content database 162 stores so-called web contents to be released to the outside by the web server 150. The web server 150 accepts external access requests through the network 180. In response thereto, the data or content complying with the request is read out from the content database 162 and is sent to the source of request through the network interface 160 and network 180. Examples of the contents are HTML files and CGI scripts provided by the web server. Additionally, files such as image files, sound clips, moving images files, document files, and page description language files that can be provided by the web servers are also examples of external contents.

Furthermore, in the present embodiment, the web server 150 includes a FTP server function, and can transmit contents stored in the content database 162 in response to a request from an FTP client.

The file database 164 is not provided by a web server or a FTP server. The file database 164 mainly stores files used within the web server 150.

Figure 2:
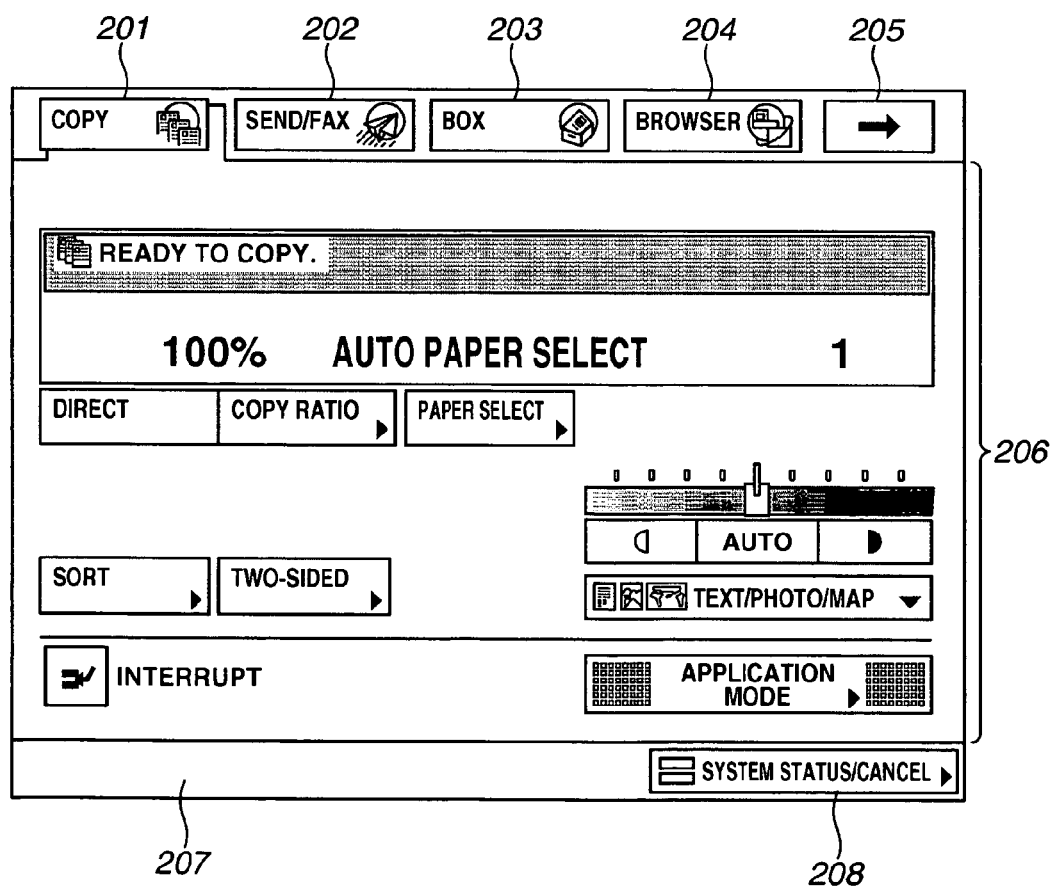
FIG. 2 shows a standard display screen of the multifunction device in operation according to the present embodiment.

FIG. 2 illustrates an example of a standard screen of the multifunction device 100 displayed on the display unit 122 of the operation section 120. As shown in FIG. 2, a plurality of touch buttons are displayed on the upper part of the display unit 122 as tab keys respectively for each function, such as "copy" tab key 201, "send/fax" tab key 202, "box" tab key 203, and "browser" tab key 204. By designating the browser tab key 204, it is possible to activate the browser function. In the case where the multifunction device 100 is provided with more than five functions, a tab key 205 of a right-pointing arrow is placed further to the right end of the four function tab keys.

The standard screen as shown in FIG. 2 is an initial screen of the copy function which is displayed when the "copy" tab key 201 is pressed. Reference numeral 206 denotes an area for displaying items relevant to the copy function, and the status that should be displayed for the copy function such as "ready to copy" is displayed on the most upper part of the display area 206. Below the status, the copy ratio, the type of paper selected, and number of copies are displayed. Additionally, "direct" key, "copy ratio" key, "paper select" key, "sort" key, "two-sided" key, and "interrupt" key are displayed as touch buttons for setting the operation mode of the copy function. Further, to adjust the color density of printing, a left-pointing arrow key for lightening, a right-pointing key for darkening, and an automatic adjusting key are displayed. Moreover, a key for specifying the type of the original image (text/photo/map) is displayed, and the initial setting is automatically switched in accordance with the type specified by the key. With respect to operating modes that cannot be displayed on the initial screen, a setting screen for specifying them is displayed in the display area 206 hierarchically by pressing the application mode key.

A display area 207 displays the status of the multifunction device 100. For example, an alarm message indicating paper jam, or a status message indicating that the printing function is activated is displayed.

By pressing the "system status/cancel" touch button 208, a screen (not shown) of the device information or print job status is displayed which enables to cancel a job.

When the "send/fax" tab key 202 is pressed, a setting screen (not shown) is displayed to send images read by the scanning section 146 to devices on the network 180 by e-mail transmission or by FTP transmission. Additionally, a setting screen (not shown) is displayed which allows facsimile transmission using a public line (not shown).

When the "box" tab key 203 is pressed, a setting screen (not shown) for the box function is displayed. Box function is a function for storing images read by the scanning section 146 in a designated area in the hard disk 140, printing the image data stored in the hard disk 140 using the printing section 148, or transmitting data to devices on the network 180.

When the "browser" tab key 204 is pressed, a browser initiating screen as illustrated in FIG. 3 is displayed. In FIG. 3, reference numeral 311 denotes an address bar that displays the URL of the content or the file name of the internal file presently displayed. In the case where a user opens a page by specifying the URL or the path name, the user presses the field of the address bar 311. Then, a soft keyboard is displayed on the screen, and the user can specify the URL or path name so as to display the desired web page or file.

When the "bookmark" key 312 is pressed, the URL or the path name of the page presently displayed can be registered. Additionally, registered bookmarks can be called up to display the corresponding page. Sorting of bookmarks can also be performed.

A display area 313 is for the content. By pressing "back" key 314 and "forward" key 315, the page currently displayed on the content display area 313 can be turned back to the previous page or turned to the next page.

"Reload" key 316 reloads and displays the currently displayed page. "Stop" key 317 cancels the loading of a page.

"Home" key 318 is for traveling to a preset homepage. "Print" key 319 is for printing the page currently displayed on the contents display area 313 using the printing section 148. When the "print" key 319 is pressed, a print setting dialog (not shown) is displayed. On the print setting dialog, a window for setting how to print a frame-configured web page, and performing other various settings such as a number of prints, duplex, and sort, is displayed. When a print start button in the window is pressed, printing is started.

"Menu" key 320 changes the magnification of the display, character size, and character code, and instructs display of the properties of the content currently being displayed.

Next, the operation of the multifunction device 100 according to the present embodiment will be described. Since the image reading operation, or scanning operation, and the image forming operation, or printing operation, of the multifunction device 100 are the same as conventional operations, descriptions of these operations are omitted. Hereinafter, the displaying operation of contents and files on the web browser of multifunction device 100 will be specifically described.

Figure 4:
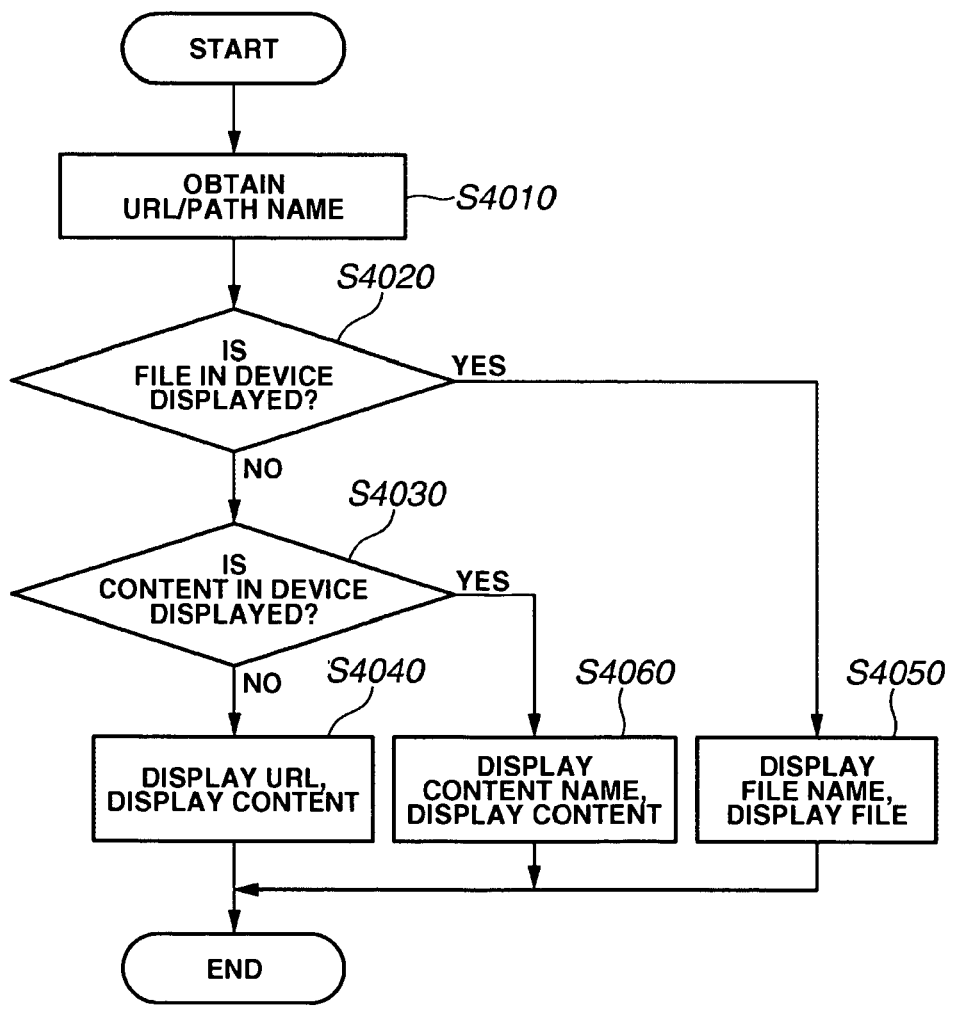
FIG. 4 is a flow chart of a display operation by the web browser function in the multifunction device.

FIG. 4 is a flowchart of the displaying operation by the web browser function 110 in the multifunction device 100 of the present embodiment. This flowchart is realized by the CPU 104 of the multifunction device 100 loading the program stored in the ROM 108 or the hard disk 140 onto the RAM 104 and executing it.

In step S4010, the URL of the contents or the path name of the file to be displayed by the web browser function 110 is obtained. The user can obtain URL or the path name by entering the URL or the path name into the address bar 311 or using the bookmark 312 to choose the desired contents. Additionally, in the case where another web page is already being displayed by the web browser function, the designated URL can be obtained by a hyperlink in the displayed web page.

In step S4020, it is determined whether the content or file to be displayed on display unit 122 by the web browser function 110 is a file within the multifunction device 100 and is stored in the internal file database 144. In the case where the content or file is determined to be a file of multifunctional device 100, the process proceeds to step s4050, and if not, the process proceeds to step s4030.

The determination whether the file is stored in the internal file database 144 is made depending on whether the resource to be displayed based on the URL or path name obtained in step s4010 is a file stored in the internal database 144.

Alternatively, there is another way of determination. A file stored in the internal file database 144 is not a file provided by the web server function 112. Therefore, the file is not accessed by a URL which begins with "http//". Accordingly, a file specified by a local path name can be determined to be a file in the internal file database 144. Additionally, if the URL of the file begins with "file.//", and the host name or IP address following "file.//" indicates the multifunction device 100 itself, then the file can be determined to be a file in the internal file database 144.

In step s4030, it is determined whether the content to be displayed on the display unit 122 by the web browser function 110 is a content within the device and is stored in the internal database 142. In the case where it is determined that the content is an internal content within the device, the process proceeds to step s4060, and in the case where the content is not an internal content, the process proceeds to step s4040.

The determination whether the content is stored in the internal content database 142 is made depending on whether the resource to be displayed on the basis of the URL or the path name obtained in step s4010 is a content stored in the internal content database 142.

Alternatively, if the URL starts with "http//" and the host name or the IP address to follow indicates the multifunction device 100 itself, then the resource specified by the URL can be determined to be a content in the internal content database 142.

In step s4040, an external content or external file provided through the network 180 is displayed on the display unit 122 by the web browser function 110. Therefore, the URL of the content or file is displayed on the address bar 311. The content is then displayed on the display unit 122.

In step s4050, a file read out from the internal file database 144 is displayed on the display unit 122 by the web browser function 110. Therefore, only the file name of the displayed internal file is shown on the address bar 311 without displaying the entire path name. The file is then displayed on display portion 122.

In step s4060, an internal content read out from the internal contents database 142 is displayed on the display unit 122 by the web browser function 110. Therefore, only the content name of the internal contents being displayed is shown on the address bar 311 without displaying the entire URL. The content is then displayed on display unit 122.

The flow ends when the process in one of the steps s4040, s4050, or s4060 ends.

Figure 5:
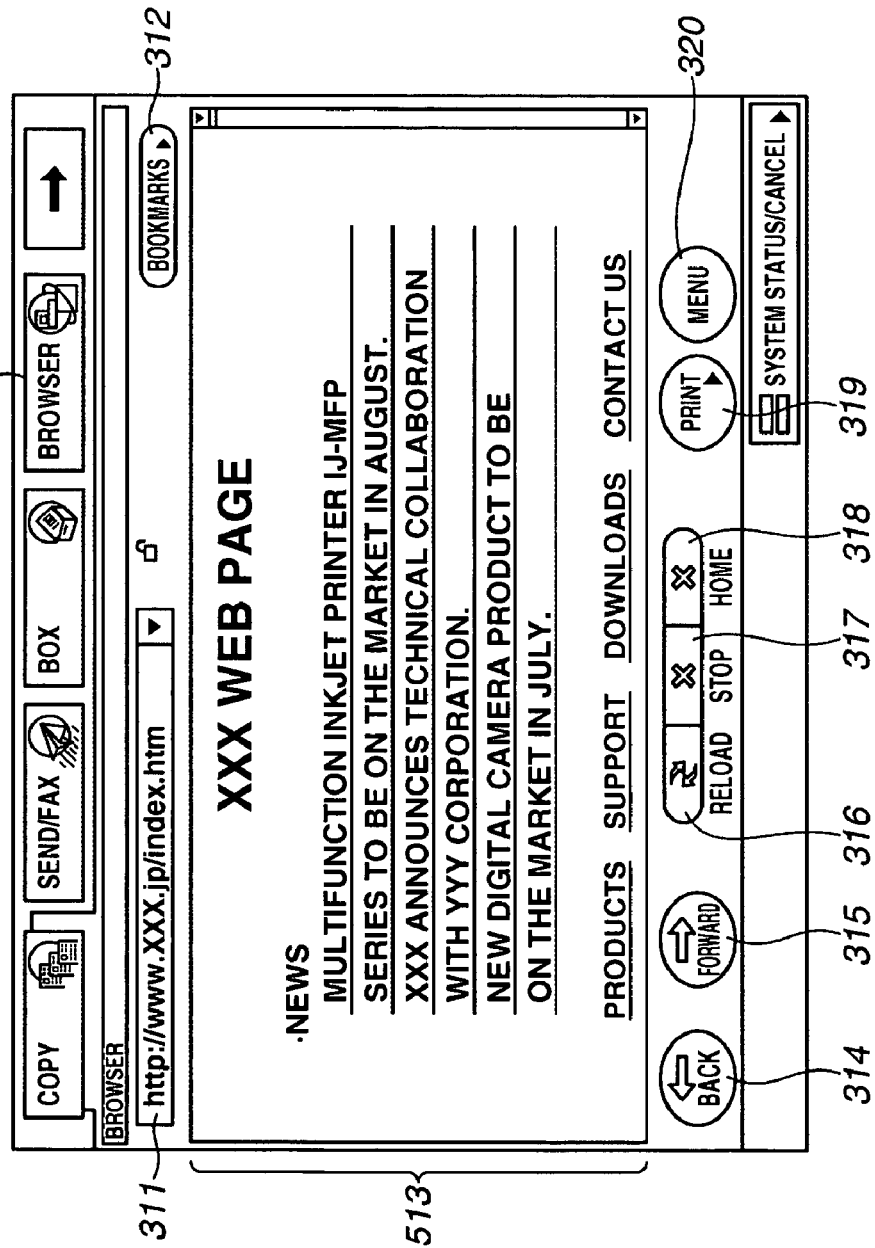
FIG. 5 shows an example of a display of an external content by the web browser.
Figure 6:
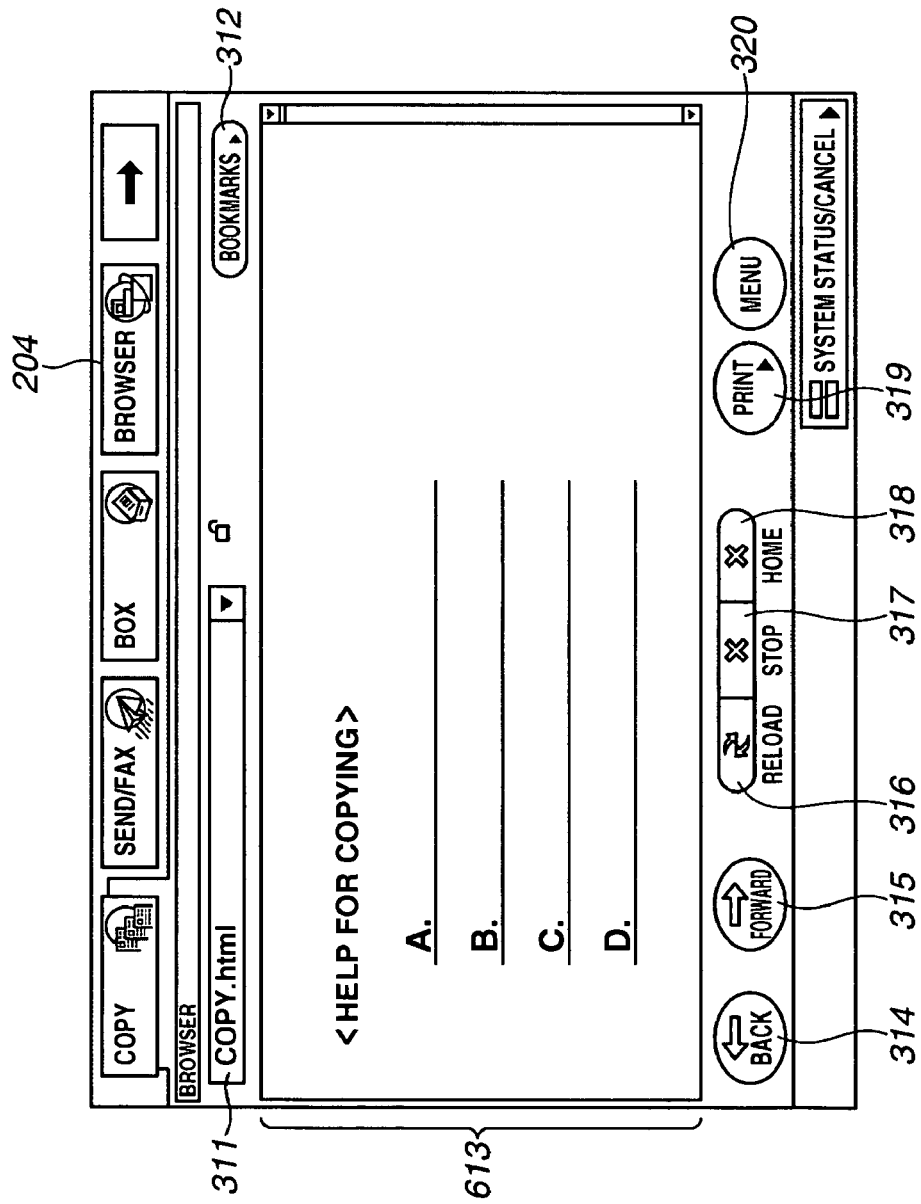
FIG. 6 shows an example of a display of an internal content by the web browser.

FIG. 5 and FIG. 6 illustrate examples of the display screen on the display unit 122 according to the present embodiment. In FIG. 5 and FIG. 6, the same reference numerals are used as in FIG. 3 to denote the same components in the drawings. FIG. 5 shows an example of a display screen in the case where an external content or file provided by an external device such as the web server 150 through the network 180 is displayed. FIG. 6 shows an example of a display screen in the case where an internal content or file 142 stored in the multifunction device 100 is displayed.

As illustrated in FIG. 5, when an external content is displayed on the display unit 122, the URL of the external content, fttp//www.XXX.jp/index.htm, is displayed as it is.

On the other hand, FIG. 6 is an example of a display in the case where an internal content within the device is displayed on the display unit 122. Normally, the URL of the internal content is originally expressed as "file.///dosdev/web/help/copy.html". However, if an address indicating the directory hierarchy as such is displayed, the internal file system configuration will become known to the user.

Therefore, according to the present embodiment, in the case where an internal content is being displayed on the display unit 122 as in FIG. 6, only the file name of the internal contents, "copy.html", is extracted and displayed on the address bar 311. The file name can be extracted from the URL, for example, by detecting the separator in the URL address such as "/".

As described above, in the case where an internal content or an internal file stored within the multifunction device 100 is displayed on the display unit 122, only the content name or file name is displayed as the URL address of the internal content without indicating the path. This will prevent the user from knowing the file system configuration such as the directory hierarchy inside the multifunction device 100. As a result, the risk of unauthorized access by users is reduced, and the security of the multifunction device is improved.

Displaying of Detailed Information

The URL display on the address bar 311 was described in reference to FIG. 4. There is another case in which the URL of the content shown on the display 122 by the web browser function 110 is displayed, namely, the detailed information window for the page currently being displayed.

Figure 7:
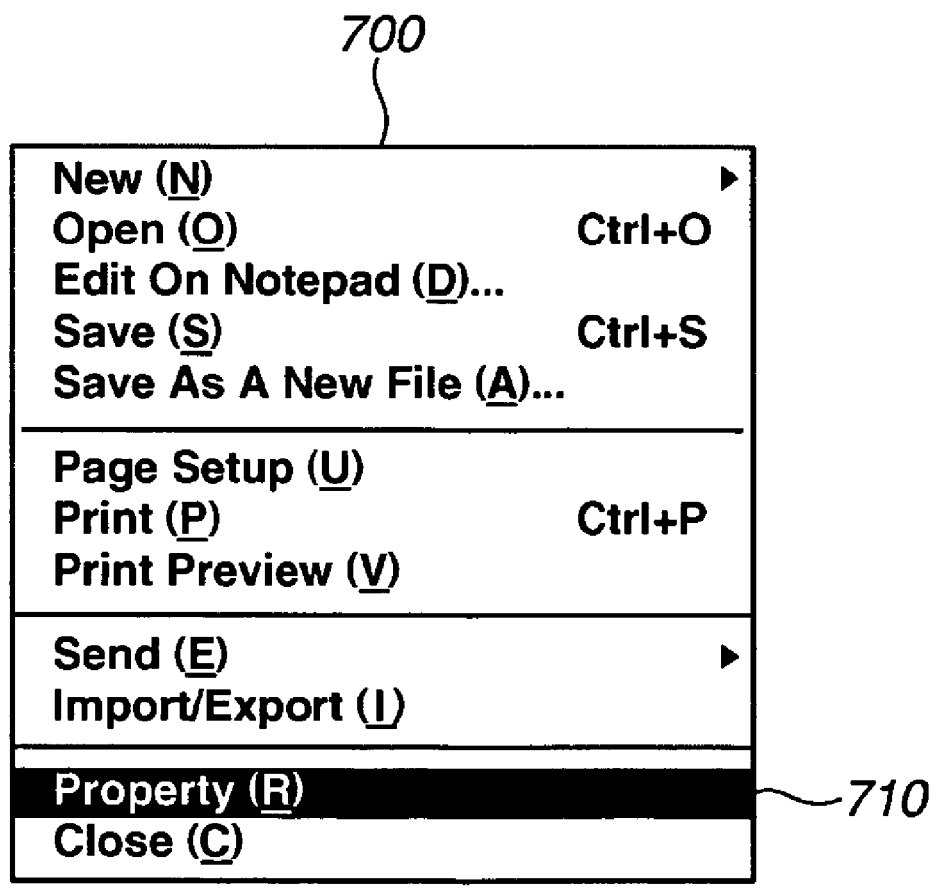
FIG. 7 shows a pop-up menu window that is displayed after pressing the menu key 320.
Figure 8:
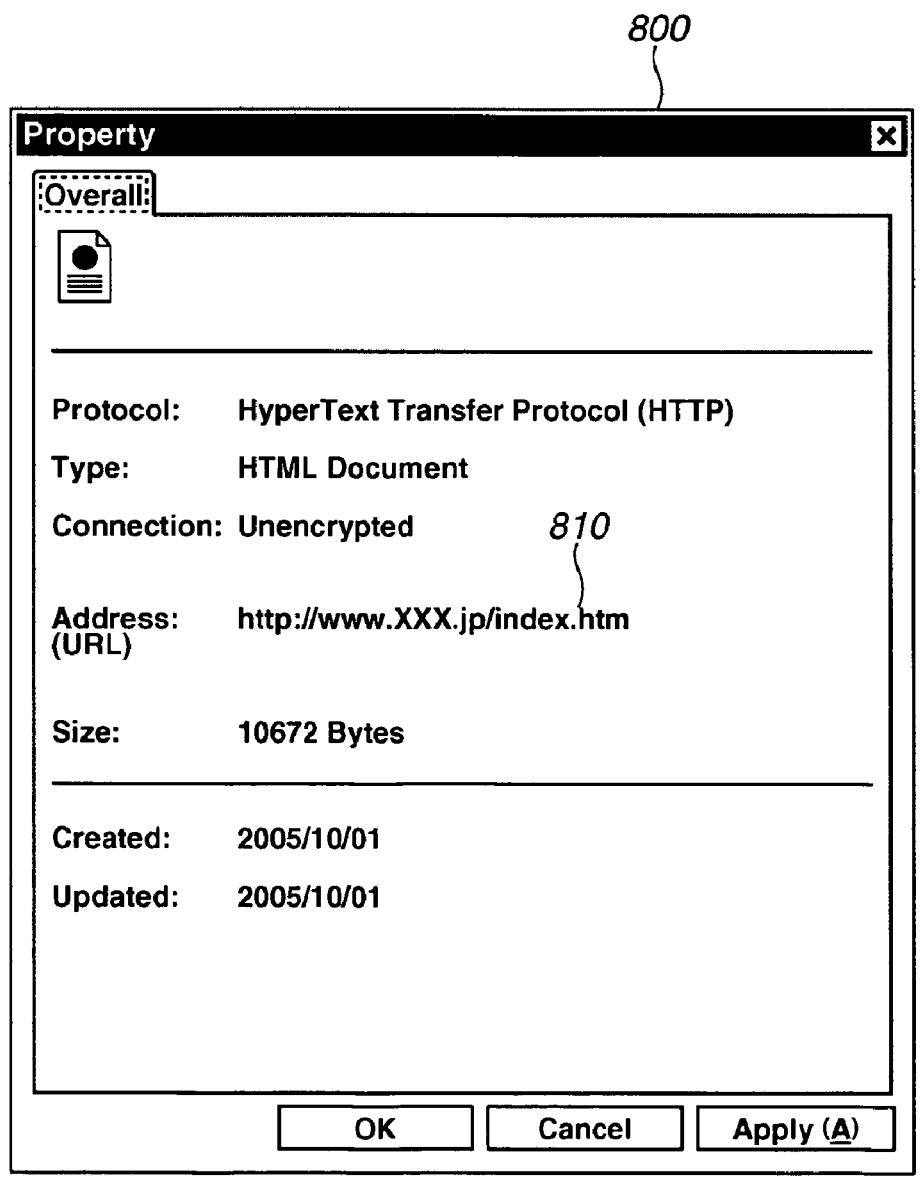
FIG. 8 shows the detailed information window for an external content.
Figure 9:
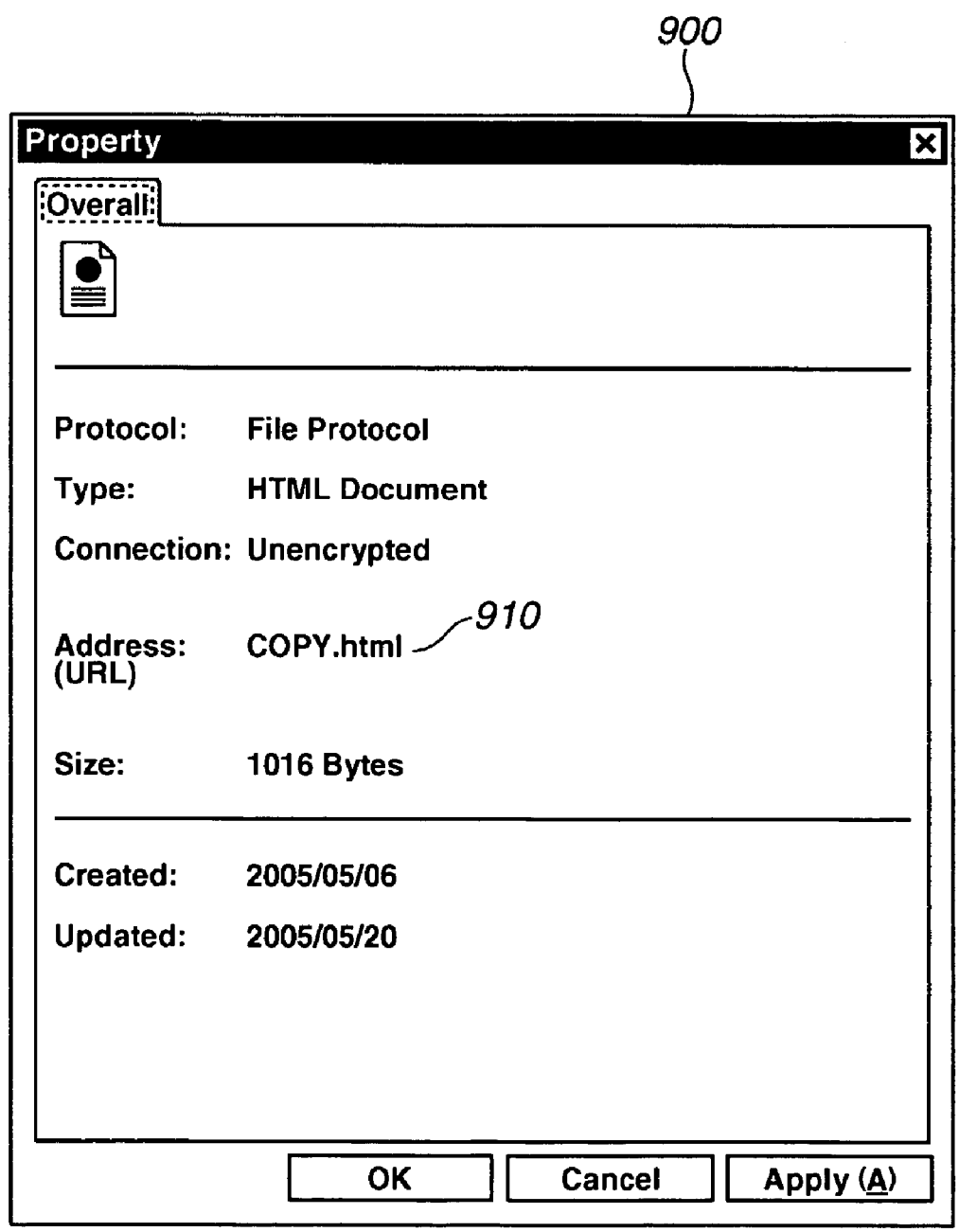
FIG. 9 shows the detailed information window for an internal content.

The detailed information windows illustrated in FIG. 8 and FIG. 9 are described below. First, the flow as shown in FIG. 4 is executed and the web browser screen as in FIG. 5 and FIG. 6 is displayed. Subsequently, when the menu key 320 is pressed, a pop-up menu window as in FIG. 7 appears on the screen. When the user selects property 710 from menu 700, detailed information on the content being displayed is shown.

FIG. 8 illustrates the detailed information window that is displayed when the user selects the property tab on the web browser display screen illustrated in FIG. 5. Various items of information on the page are displayed on the detailed display window 800. The URL is included among the information. In the case of FIG. 8, since the detailed information is about an external content, the URL is shown as it is.

FIG. 9 illustrates a detailed information window that is displayed when the user selects the property tab on the web browser display screen illustrated in FIG. 6. The display form of the detailed display window 900 is the same as the detailed display window 800 in FIG. 8. However, since the detailed information in FIG. 9 is about an internal content, the entire URL is not displayed as it is, and instead, a file name, "COPY.html", is displayed as the URL.

Printing of Contents

The multifunction device 100 can print out contents displayed on the display unit 122 by the web browser function 110 using the printing section 148. Print instruction can be given by operating the print tab key 319. The controller 102 which controls the printing section 148 includes a function for printing the URL of the content in a predefined position of the printout. In this case, a choice can be made between printing out the URL as it is or printing only the file name.

FIG. 10 is the printout of a content displayed on the web browser display screen in FIG. 5 which is made by the printing section 148. At the lower part of the output 1000, the URL 1010 of the content is printed as a footer, separate from the image of the content. Since the content printed in FIG. 10 is an external content, the URL 1010 is printed as it is as the footer.

Figure 11:
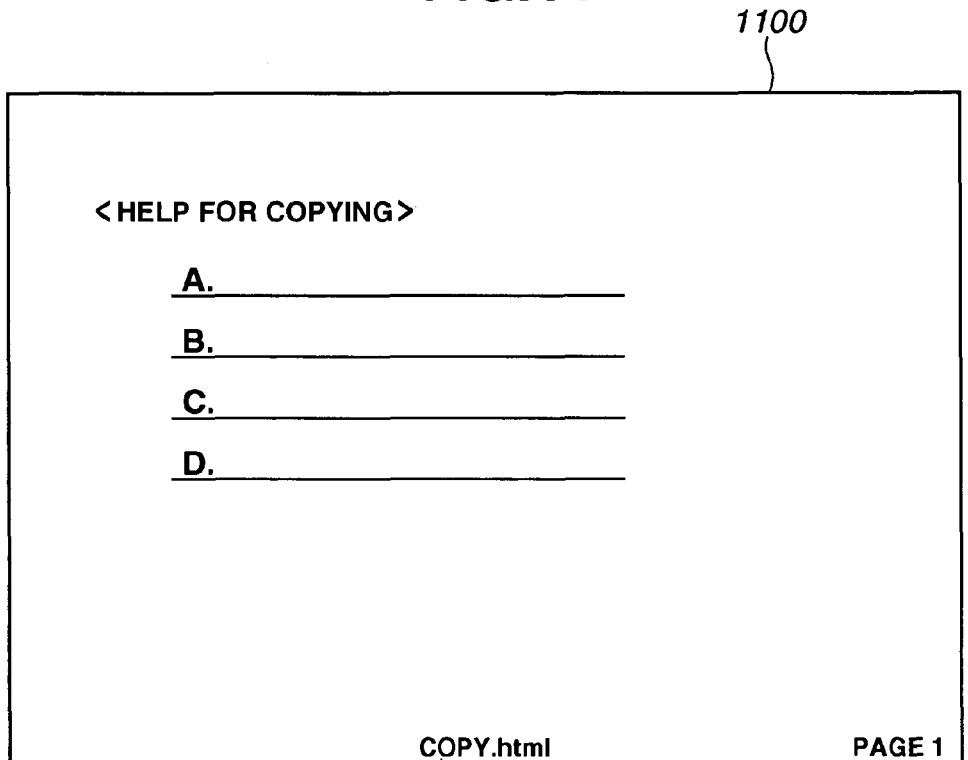
FIG. 11 shows an example of a printout of an internal content.

FIG. 11 is the printout of a content displayed on the web browser display screen in FIG. 6 by the printing section 148. Since the content printed in FIG. 11 is an internal content of the multifunction device 100, the entire URL is not printed but only the file name is printed as the footer.

Bookmark Management Window

The web browser function 110 can register bookmarks of contents in the multifunction device or external contents using the bookmark key 312. Detailed information on the bookmark can be displayed and the bookmark can be edited using the bookmark key 312. The URL can also be displayed and edited within the detailed information of the bookmark.

Figure 12:
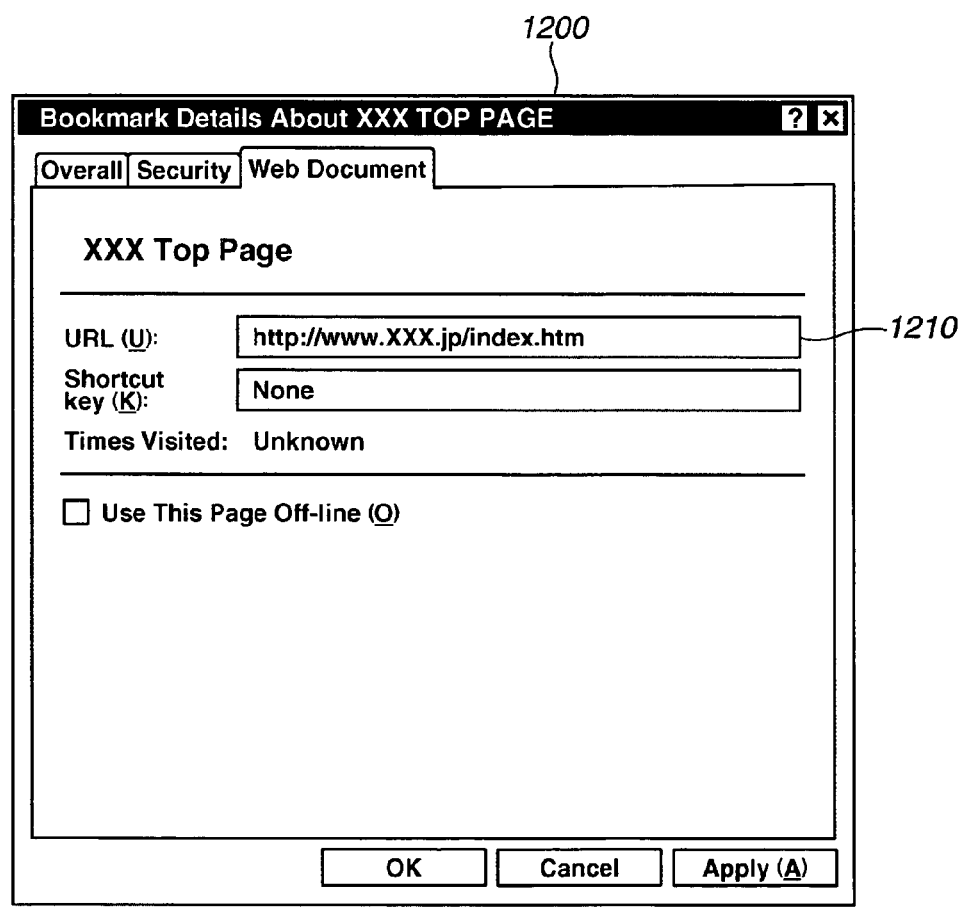
FIG. 12 shows the detailed information window for a bookmark for an external content.

FIG. 12 illustrates a detailed information display window of the bookmark for "http//www.XXX.jp/index.htm" which is the URL of an external content being displayed in FIG. 5. In the bookmark detailed information window 1200 of this page, there is a URL edit field 1210. In the case of FIG. 12, since the bookmark is for an external content, the URL is displayed as it is on the URL edit field 1210.

Figure 13:
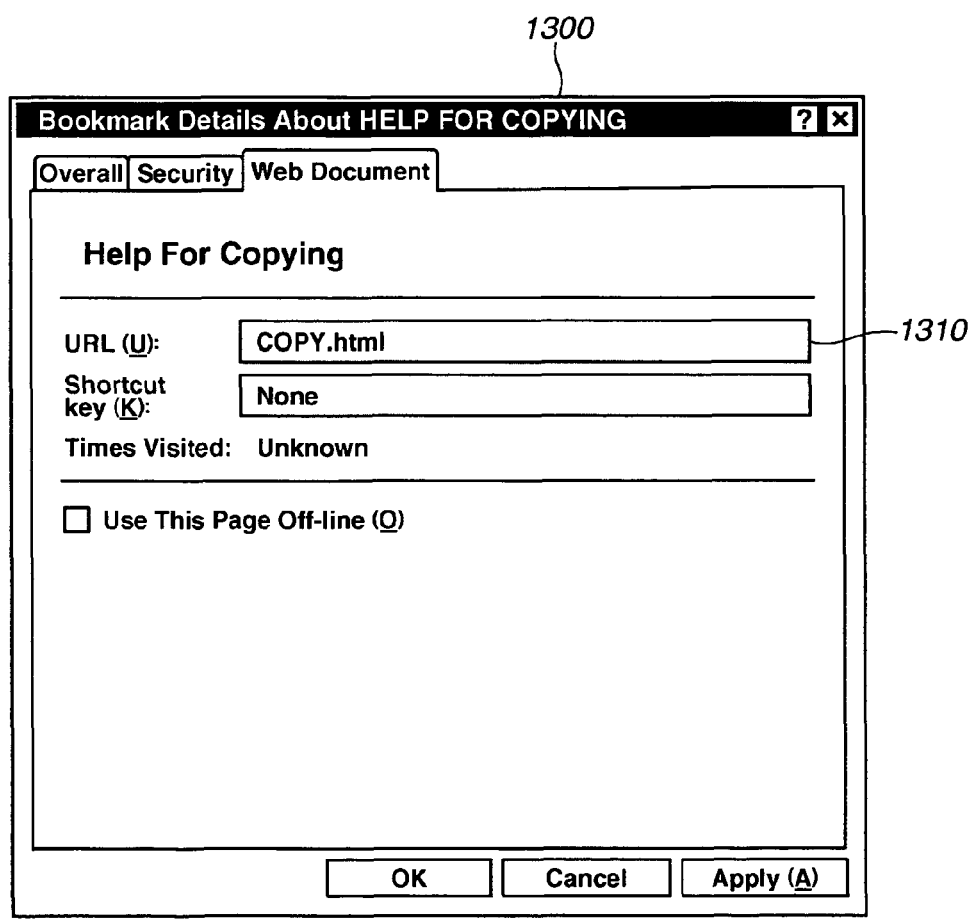
FIG. 13 shows the detailed information window for a bookmark for the internal contents.

FIG. 13 illustrates a detailed information window for the bookmark of "file///dosdev/web/help/copy.html" which is the URL of an internal content of the multifunction device 100 displayed in FIG. 6. In the bookmark detailed information window 1300 of this page, there is also a URL edit field 1310. In the case of FIG. 13, since the bookmark is for an internal content of the multifunction device 100, only the file name is displayed. However, it is only in the URL edit field 1310 that the entire URL is not displayed. Since the web browser function 110 stores and manages the URL of the content as it is, the bookmark can function correctly.

Displaying the URL of the Page to be Liked

Figure 14:
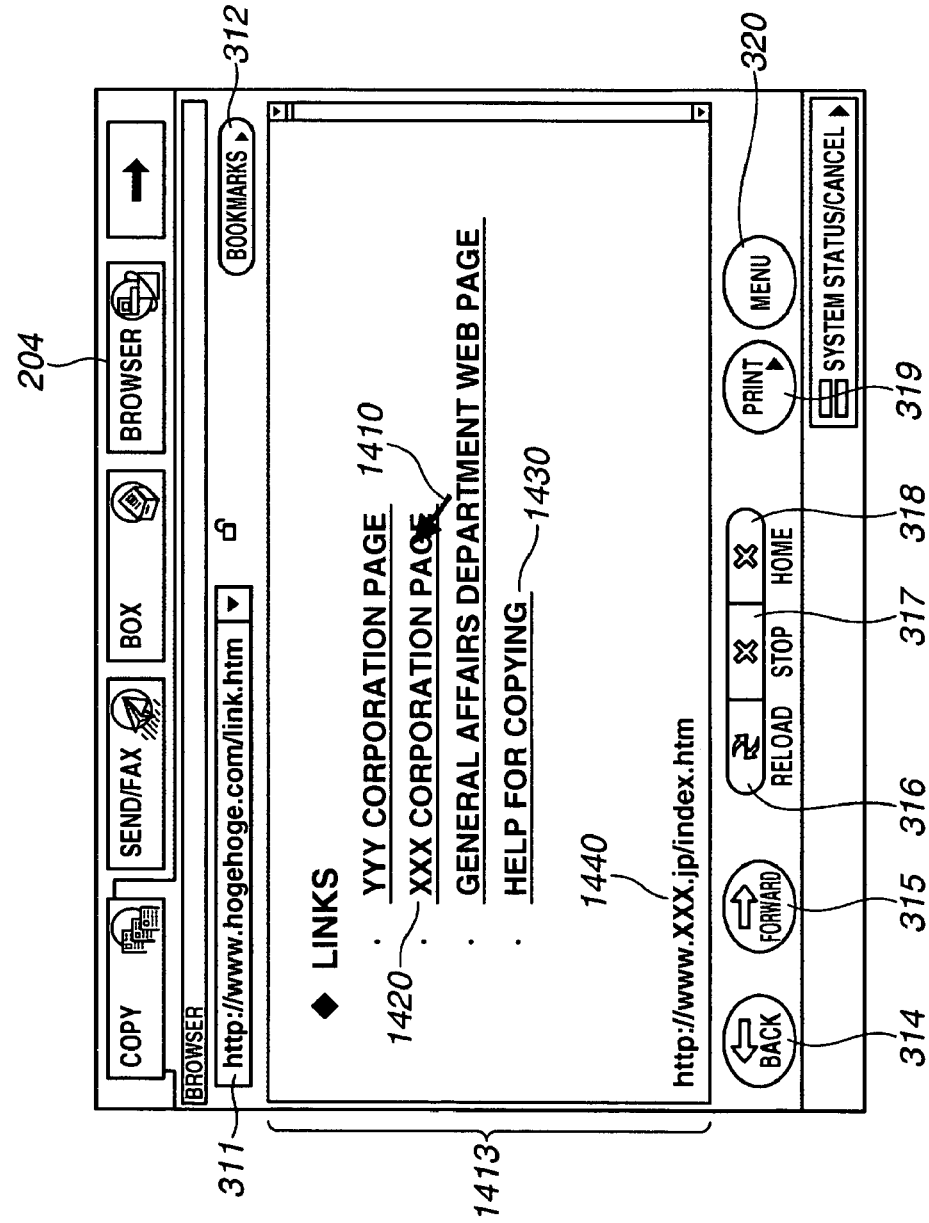
FIG. 14 shows an example of a content display screen by the web browser.
Figure 15:
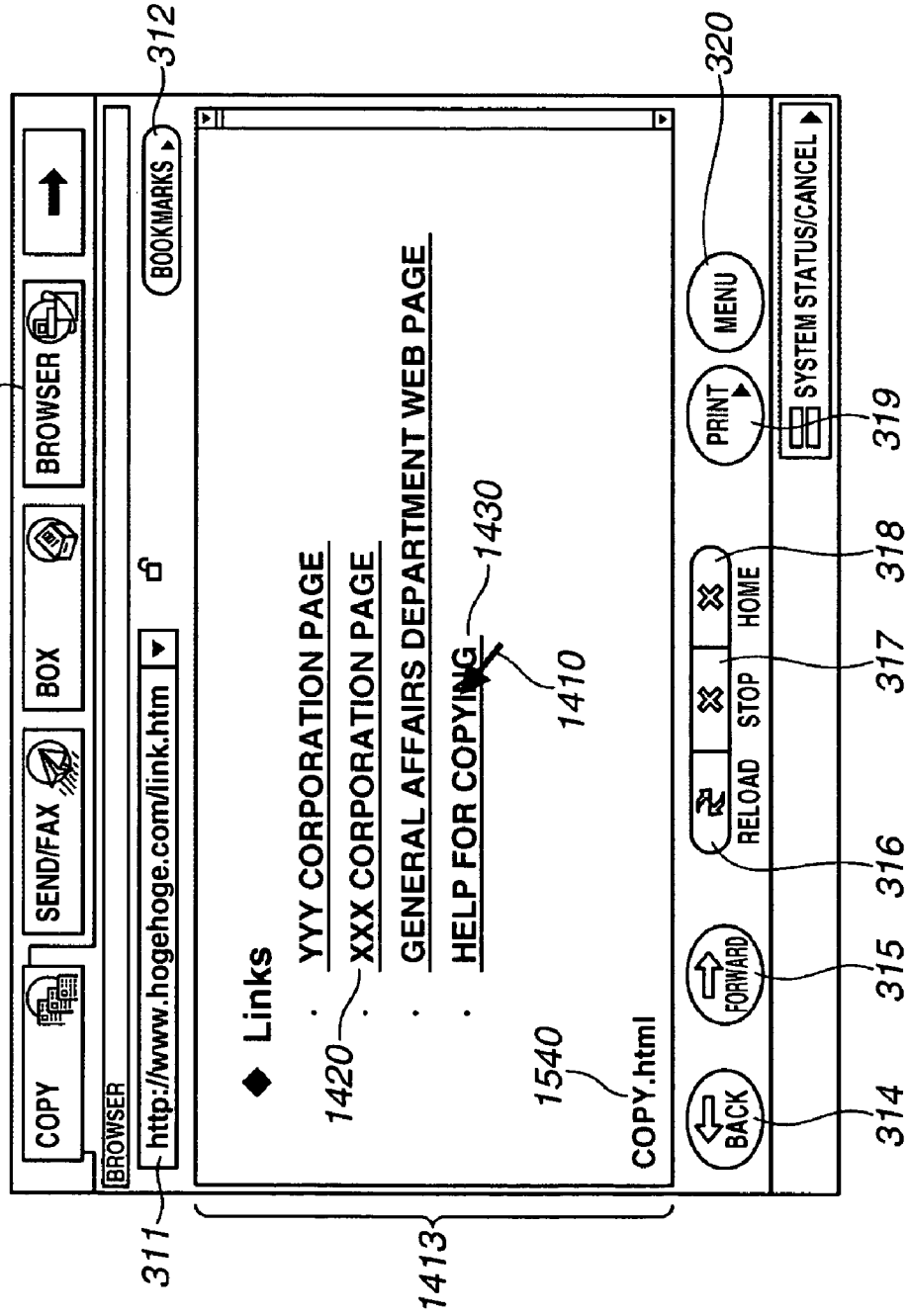
FIG. 15 shows an example of a content display screen by the web browser.

FIG. 14 and FIG. 15 illustrate a screen displaying a content having the URL, "http//www.hogehoge.com/link.htm", on the display unit 122. The URL is different from the contents of FIG. 5 and FIG. 6. On the display screen 1413, a hyperlink 1420 having a description, "XXX corporation page", is shown, that is linked to "http//www.XXX.jp/index.htm" displayed in FIG. 5. Additionally, a hyperlink 1430 having a description, "Help for copying", is shown, that is linked to "file//dosdev/web/help/copy.html" shown in FIG. 6.

In FIG. 14, a pointer 1410, such as a mouse pointer, which is displayed when the user operates on the manual operation unit 124, is placed in the hyperlink 1420 of "XXX corporation page".

When the pointer 1410 is positioned to a hyperlink, the web browser function 110 displays the URL of the hyperlink on the lower left hand-side of the display screen. The form of the URL display changes depending on whether the content indicated by the URL of the hyperlink is an internal content or an external content.

In the case of FIG. 14, since the content of the hyperlinked page designated by the pointer 1410 is an external content of the multifunction device 100, the URL of the linked content is displayed as it is as indicated in 1440.

On the other hand, in the case of FIG. 15, the content of the hyperlinked page designated by the pointer 1410 is an internal content. Therefore, the URL of the linked content is not displayed as it is, and only the file name is displayed as indicated in 1540.

According to the present embodiment, in the case where a content within the internal file system that should be kept secret is displayed, the address of the content or file can be displayed without letting the user know the file system configuration. This enables reduction of the risk that the user may gain unauthorized access to the file system within the device and improves the security.

Second Embodiment

In the second embodiment of the present invention, the system configuration is the same as that shown in FIG. 1. The initial screen of the multifunction device 100 and the display screen of web browser function 110 are the same as in FIG. 2 and FIG. 3.

In the first embodiment, as explained with reference to the flowchart of FIG. 4, the URL of the content in the internal content database 142 or the path name of the file in the internal file database 144 included in the multifunction device 100 was not displayed.

However, contents in the internal content database 142 are originally intended to be disclosed by the web server function 112 of the multifunction device 100. Therefore, if it is the internal content database 142, there may be cases in which it does not matter that the directory configuration becomes known.

Figure 16:
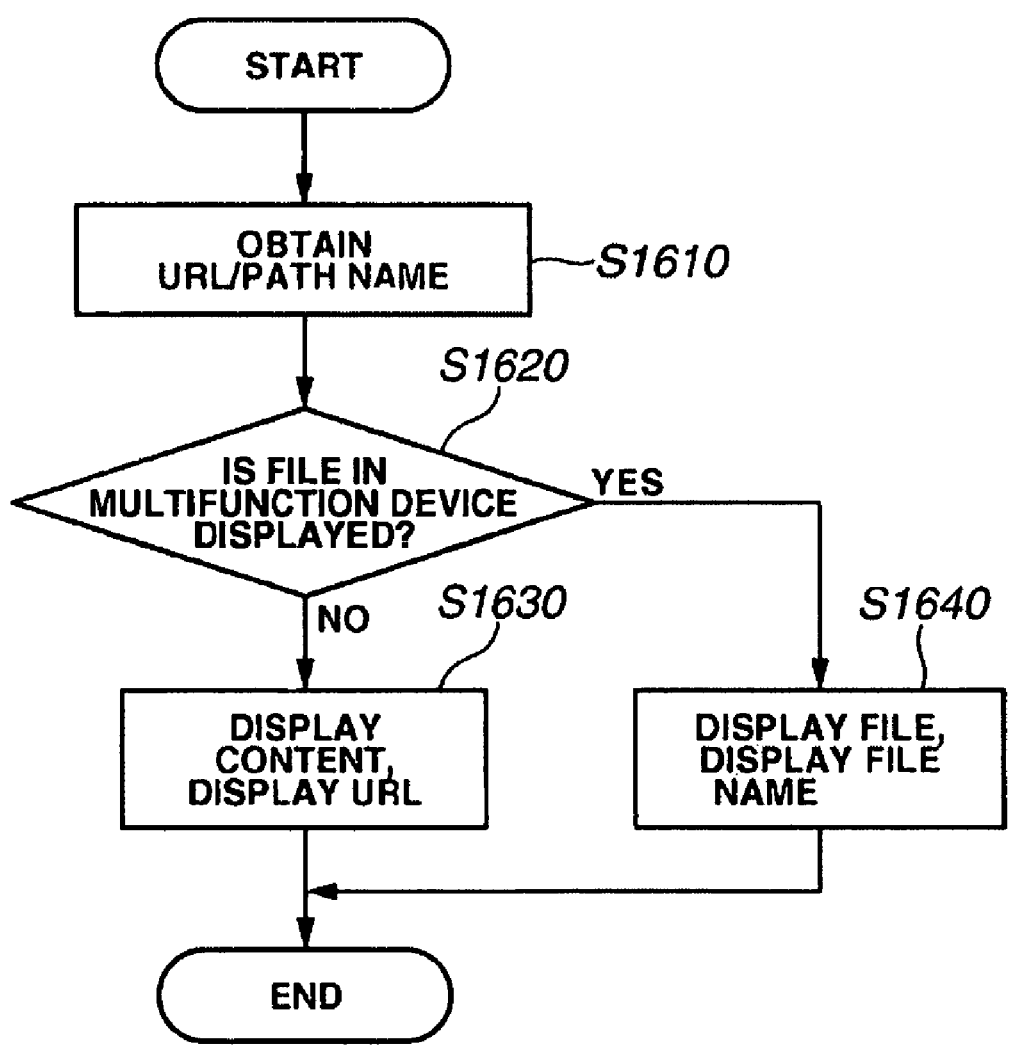
FIG. 16 is a flowchart of the display operation performed by the web browser function in the multifunction device.

FIG. 16 is a flowchart of the display operation performed by the web browser function 110 in the multifunction device 100 according to the second embodiment. This flowchart is realized by the CPU 104 in the multifunction device 100 loading the program stored in the ROM 108 or the hard disk 104 onto the RAM 106 and executing it.

In step s1610, the URL or the path name of the content to be displayed by the web browser function 110 is obtained. This is the same process as in step s4010 in FIG. 4.

In step s1620, it is determined whether the content or the file to be displayed on the display unit 122 by the web browser function 110 is a file within the multifunction device 100 and is stored in the internal file database 144. This is the same process as in step s4020 in FIG. 4.

In the case where it is determined that the content or file is not a file in the internal file database of the multifunction device 100 in step s1620, the process proceeds to step s1630. In step s1630, the content specified by the URL obtained in step s1610 is displayed on the display unit 122, and the URL is displayed as it is on the address bar 311. Also in the case where the content of the internal content database 144 is to be displayed, its URL is displayed as it is.

On the other hand, in step s1620, if the content or file is determined to be a file in the internal file database of the multifunction device 100, then the process proceeds to step s1640. In step s1640, an internal file specified by the path name obtained in step s1610 is displayed on the display unit 122, and only the file name is displayed on the address bar 311.

Another method of determination can be used in step s1620.

Contents in the internal content database 142 or in the content database 162 of the web server 150 are resources to be released to the outside and are accessed using HyperText Transfer Protocol (HTTP). On the other hand, the internal file database 144 and file database 164 of the web server 150 are resources that are not to be released to the outside and are generally accessed using protocols other than HTTP such as Service Message Block (SMB).

That is, in step s1620, it is determined whether to display the URL as it is as in step s1630 or to display only the file name as in step s1640, based on the protocol used by the web browser function 110 in accessing a resource.

For example, in the case where a resource is accessed using HTTP, the process proceeds to step s1630, and the content specified by the URL which was obtained in step s1610 is displayed on the display unit 122, and the URL is displayed as it is on the address bar 311.

Meanwhile, in the case where a resource is accessed using a protocol other than HTTP, the process proceeds to step s1640, and the file specified by the path name which was obtained in step s1610 is displayed on the display unit 122, and only the file name is displayed on the address bar 311.

According to the second embodiment, when a file in the internal file database among the resource of multifunctional device 100 is to be displayed on the web browser and its file system should be kept secret, the file system, that includes the directory configuration, will not become known. Consequently, the risk of unauthorized access to files inside the multifunctional device can be reduced, and security is improved.

Third Embodiment

According to the above embodiment, when the URL of the internal content or file stored within the device is not displayed in full, only the content name or the file name is displayed. However, instead of omitting the whole path name, it is possible to display the URL or path name with only a part of the URL or path name omitted or concealed so that the user cannot recognize the file system configuration and other relevant information.

Alternatively, it is also possible to just display a message as "internal file of the device" without even displaying the file name.

In the above case where the URL is not displayed as it is, the display form of the URL can be stored as setting information in the hard disk 140 of the multifunction device 100 and the user such as an administrator with a specified privilege can be allowed to change the setting.

If such setting is allowed, its changes could be flexibly made. If security is considered first, even the file name is not displayed. However, if user-friendliness is considered first, a part of the file name or URL is displayed, depending on the security policy.

Other Embodiments

In order to operate the various devices to realize the above described embodiment, a software program code for realizing such operations can be supplied to the apparatus connected to such various devices or to computers within the system. Operating the various devices according to the program stored in the computer (CPU or MPU) of the system or the apparatus is also included in the scope of the present invention.

Additionally, in the above case, the software program code itself realizes the operations of the embodiment, and the program code itself constitutes the present invention. Moreover, a means for supplying the program code to a computer, for example a recording medium (e.g., a non-transitory computer-readable medium containing computer-executable instructions) that stores the program code constitutes the present invention. Such recording medium can be, for example, a flexible disk, hard disk, optical disk, magnetic optical disk, CD-ROM, magnetic tape, nonvolatile memory card, or ROM.

Furthermore, in the case where the program code supplied to the computer realizes the operations of the above embodiment in collaboration with an operating system (OS) or other application software running on the computer, such program code is considered to be an embodiment of the present invention.

Furthermore, in the case where the supplied program code is stored in the memory equipped in a function enhancement board of the computer or a function enhancement unit connected to the computer, and the CPU in the function enhancement board or the function enhancement unit executes all or part of the processing based on the instructions of the program code to realize the operations of the embodiment, the program code is included in the present invention.

Figure 17:
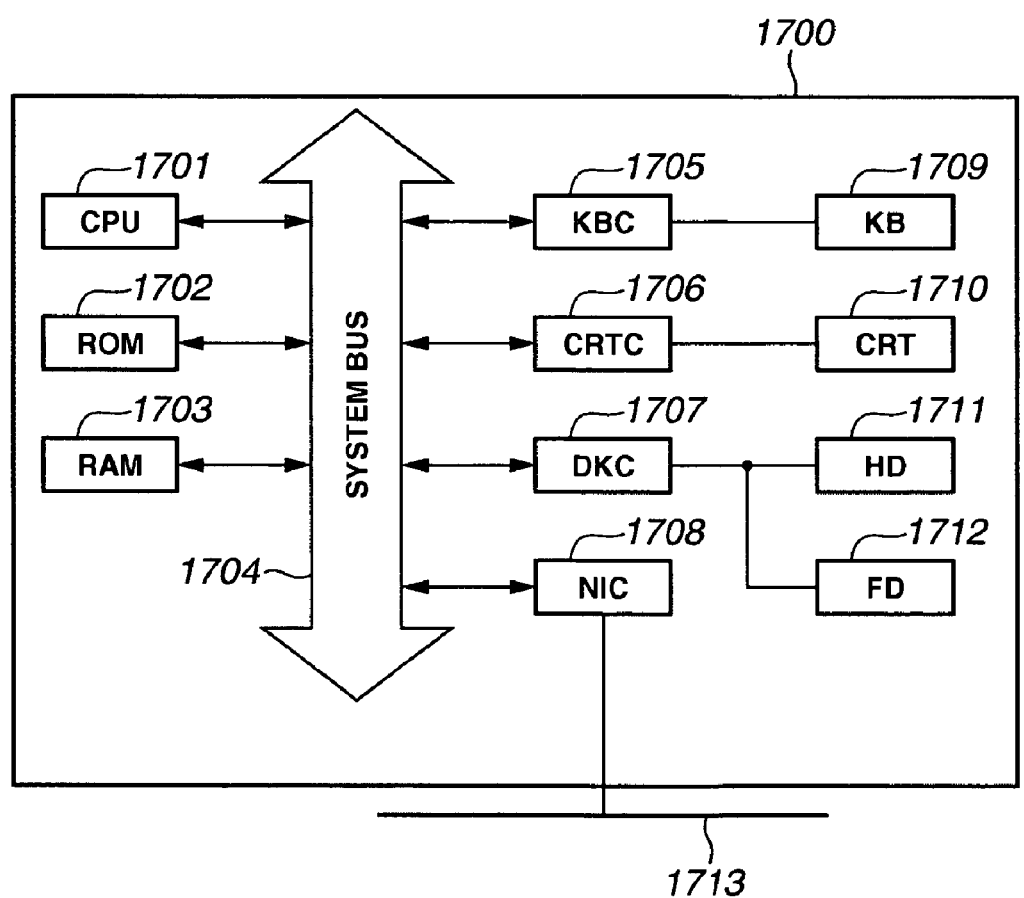
FIG. 17 is a block diagram of a computer in which the operation of the image processing apparatus according to the present embodiment can be realized.

For example, instead of an image processing apparatus described in the above embodiment, the operations of the embodiment can be implemented by a computer 1700 as shown in FIG. 17.

As shown in FIG. 17, a computer 1700 includes a CPU 1701, ROM 1702, RAM 1703, and a keyboard controller (KBC) 1705 for keyboard (KB) 1709. Additionally, a CRT controller (CRTC) 1706 for CRT display (CRT) 1710, a disk controller (DKC) 1707 for hard disk (HD) 1711 and flexible disk (FD) 1712, and a network interface card (NIC) 1708 are connected so as to be able to communicate through system bus 1704.

CPU 1701 controls comprehensively each component connected to the system bus 1704 by running the software stored in ROM 1702 or HD 1711, or supplied from FD 1712. That is, CPU 1701 loads the processing program for carrying out the above operations from ROM 1702, HD 1711, or FD 1712, and executes the program to perform the control for realizing operations of the embodiment.

RAM 1703 functions as a main memory or work area for CPU 1701. KBC 1705 controls the instruction input from KB 1709 or pointing device (not shown). CRTC 1706 controls the display of CRT 1710. DKC1707 controls the access to HD 1711 and FD 1712 that store boot programs, various applications, user files, the network management program, and the processing program in the above embodiment. NIC 1708 exchanges data with other apparatus on the network 1713.

HD 1711 includes an internal content database and internal file database in the same way as the hard disk 140 of the multifunction device in FIG. 1. In addition, the program for realizing the web browser function or the web server function is installed in HD 1711, and such function can be realized by the CPU 1701 executing the program. Furthermore, the computer 1700 can access a web server equivalent to the web server 150 in FIG. 1 through the network 1713.

According to the present invention, in the case where an image based on an internal content or internal file within a device is displayed on a web browser, it is possible to display the name of the content or file without letting the user know the file system configuration by abbreviating the address. This will enable prevention of unauthorized access to the file system inside the device by users and the security is improved.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus comprising:
   a web browser configured to access, by using one of a URL which begins with "file://" or "http://", a file stored in a storage unit included in the image processing apparatus, and to allow the file acquired by the access to be displayed; and
   a control unit configured to control, if the web browser accesses the file stored in the storage unit by using the URL which begins with "http://", to allow display of a character sequence representing the URL of the file acquired by the access which begins with "http://", and if the web browser accesses the file stored in the storage unit by using the URL which begins with "file://", to restrict display of a character sequence representing the URL of the file acquired by the access using the URL which begins with "file://" such that a hierarchal structure of a file system managing the file stored in the storage unit is hidden.

2. The image processing apparatus according to claim 1, wherein the web browser further accesses an external file stored in an external apparatus which is capable of communicating with the image processing apparatus via a network and allows content of the external file acquired by the access to be displayed, and
   wherein the control unit performs control to display a character sequence representing a URL of the external file, if the file acquired by the web browser is the external file.

3. The image processing apparatus according to claim 1, wherein the control unit performs control to display a file name of the file accessed by using the URL which begins with "file://" if the web browser accesses the file stored in the storage unit by using the URL which begins with "file://".

4. The image processing apparatus according to claim 1, wherein the control unit performs control to conceal at least a part of the character sequence representing the URL of the file accessed by using the URL which begins with "file://", if the web browser accesses the file stored in the storage unit by using the URL which begins with "file://".

5. The image processing apparatus according to claim 1, further comprising a printing unit configured to print an image based on the file acquired by the web browser and the character sequence representing the URL of the file,
   wherein the control unit controls the printing unit not to print the character sequence representing the URL of the file accessed by using the URL which begins with "file://", if the web browser accesses the file stored in the storage unit by using the URL which begins with "file://".

6. The image processing apparatus according to claim 1, wherein the file stored in the storage unit is any of a HTML file and a document file generated by an application.

7. The image processing apparatus according to claim 1, wherein the file stored in the storage unit is any of image data input by a scanner, image data output by a printer, and a configuration file of the image processing apparatus.

8. The image processing apparatus according to claim 1, wherein the web browser displays an obtained file as a web page.

9. The image processing apparatus according to claim 8, wherein the URL can be obtained by a hyperlink in the displayed web page.

10. The image processing apparatus according to claim 8, wherein in a case where an instruction for displaying a bookmark of the web page is issued by a user and the web browser accesses the file stored in the storage unit by using the URL which begins with "file://", the control unit restricts display of a character sequence representing the URL of the file which begins "file://".

11. The image processing apparatus according to claim 8, wherein in a case where an instruction for displaying a property of a file displayed by the display unit is issued by a user and the web browser accesses the file stored in the storage unit by using the URL which begins with "file://", the control unit restricts display of a character sequence representing the URL of the file which begins "file://".

12. A control method for controlling an image processing apparatus, the method comprising:
   accessing via a web browser, by one of a URL which begins with "file://" or "http://", a file stored in a storage unit included in the image processing apparatus, and displaying the file acquired by the access; and
   controlling via a control unit, if the file stored in the storage unit is accessed by using the URL which begins with "http://", to allow display of a character sequence representing the URL of the file acquired by the access using the URL which begins with "http://", and if the file stored in the storage unit is accessed by using the URL which begins with "file://", to restrict display of a character sequence representing the URL of the file acquired by the access using the URL which begins with "file://" such that a hierarchal structure of a file system managing the file stored in the storage unit is hidden.

13. A non-transitory computer-readable storage medium containing computer-executable instructions for controlling an image processing apparatus, the medium comprising:
   computer-executable instructions that cause a web browser to access, by using one of a URL which begins with "file://" or "http://", a file stored in a storage unit included in the image processing apparatus, and displaying the file acquired by the access; and
   computer-executable instructions that cause a controller to control, if the file stored in the storage unit is accessed by using the URL which begins with "http://", to allow display of a character sequence representing the URL of the file acquired by the access using the URL which begins with "http://", and if the file stored in the storage unit is accessed by using the URL which begins with "file://", to restrict display of a character sequence representing the URL of the file acquired by the access using the URL which begins with "file://" such that a hierarchal structure of a file system managing the file stored in the storage unit is hidden.

* * * * *